United States Patent [19]

Park

[11] Patent Number: 5,295,237

[45] Date of Patent: Mar. 15, 1994

[54] IMAGE ROTATION METHOD AND IMAGE ROTATION PROCESSING APPARATUS

[75] Inventor: You-keun Park, Seoul, Rep. of Korea

[73] Assignee: Samsung Electronics Co., Ltd., Kyunggi, Rep. of Korea

[21] Appl. No.: 740,137

[22] Filed: Aug. 5, 1991

[30] Foreign Application Priority Data

Dec. 31, 1990 [KR] Rep. of Korea ............ 90-22757

[51] Int. Cl.$^5$ .......................................... G06F 15/62
[52] U.S. Cl. .................................. 395/137; 395/127; 395/133; 395/136
[58] Field of Search ............... 395/137, 127, 133, 136, 395/137, 138

[56] References Cited

U.S. PATENT DOCUMENTS

| | | | |
|---|---|---|---|
| 4,929,085 | 5/1990 | Kajihara | 395/137 |
| 4,930,088 | 5/1990 | Horiguchi | 395/137 |
| 4,985,849 | 1/1991 | Hideaki | 395/137 |
| 5,067,167 | 11/1991 | Berger | 395/137 X |
| 5,081,700 | 1/1992 | Crozier | 395/137 X |

Primary Examiner—Gary V. Harkcom
Assistant Examiner—Almis Jankus
Attorney, Agent, or Firm—Leydig, Voit & Mayer

[57] ABSTRACT

An image rotation method and an image rotation processing apparatus in an image processing apparatus are disclosed. The image rotation method obtains the image coordinates (x',y') of a rotated image which is recorded in a second memory, by sequentially scanning a first memory where the M×N original image is recorded and adding the increments of x and y corresponding to a rotation angle $\theta$ repeatedly, and transmits the image element data of the coordinates (x,y) of the first memory to the coordinates (x',y') of the second memory with one-to-one correspondence, thereby obtaining the rotated image through the rotation angle $\theta$ from the original image. Thus, the present invention can obtain the rotated image using only addition operations and without any multiplication operations, so that high-speed operation is possible and an image can be rotated through a specified angle $\theta$ through software in common computer graphic systems having no floating point multiplier.

6 Claims, 5 Drawing Sheets

IMAGE ROTATION METHOD AND IMAGE ROTATION PROCESSING APPARATUS

BACKGROUND OF THE INVENTION

The present invention relates to an image processing method and apparatus, and more particularly to an image rotation method and an image rotation processing apparatus which can perform high-speed real-time processing.

Recently introduced computer image processing systems carry out image processing functions such as reduction or enlargement of an image, rotation, etc. Since the system needs to process a great deal of information at a high speed, a high-priced, special operation processing circuit is provided pertaining to each field. Accordingly, in a general personal computer which is not provided with the special operation processing circuit, image processing such as reduction, enlargement, rotation, etc. depends on software, so that the processing speed is slow and the real-time processing is difficult.

For example, when the image rotation method displays an image on an X-Y plane, and the coordinates of the present position of the image element are denoted (x,y), the coordinates of the resulting position of the image element after rotation through a specified angle $\theta$ are denoted (x',y'). These post-rotational image element coordinates (x',y') are easily obtained according to image transformation relations including the following matrix relations.

The matrix relations are as follows.

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix} \quad (1)$$

From the above matrix relations (1), the coordinate of the X-axis (herein denoted x') and the coordinate of the Y-axis (herein denoted y') of the image element coordinates (x', y') after rotational transformation are obtained easily.

$$\begin{matrix} x' = x\cos\theta - y\sin\theta \\ y' = x\sin\theta + y\cos\theta \end{matrix} \quad (2)$$

Here, if the sine value ($\sin\theta$) and the cosine value ($\cos\theta$) of the rotational displacement resulting from rotation through the stated specified angle $\theta$ are denoted as first and second rotational displacement data (m, n) respectively, the relations (2) may be changed to the following relations (3).

$$\begin{matrix} x' = nx - my \\ y' = mx + ny \end{matrix} \quad (3)$$

Therefore, if the X-axis point (herein x) and the Y-axis point (herein y) of the coordinates of the image element (x,y) before rotation are known, the coordinates (x',y') of the new position can be obtained by four multiplication operations, based on the relations (3).

Thus, since the conventional method requires the four multiplication operations when the image rotates, a floating point multiplier is needed for the image rotation processing hardware. The image processing system of a general personal computer without such hardware processes the multiplication through software, but requires such a long time to do the four multiplication operations of the rotation, that real-time processing is difficult.

SUMMARY OF THE INVENTION

It is an object of the present invention to provide an image rotation method which can do a high-speed, real-time processing, to solve the conventional problem.

It is another object of the present invention to provide an image rotation processing apparatus which simplifies circuit constitution and reduces cost.

To achieve the objects, an image rotation method for rotating an image which determines coordinates of a second memory for recording a rotated image from coordinates of an M×N image in the first memory and transmits the data of the image elements related to the determined coordinates from the first memory to the second memory, to obtain the image rotated from the M×N image stored in the first memory by a specified angle $\theta$ using the reference point as a rotational axis, comprises the steps of:

step (a) of setting the cosine value ($\cos\theta = n$) and the sine value ($\sin\theta = m$) with respect to said rotation angle $\theta$ of the unit point on the x-axis of the first memory to a first initial value (n,m) of coordinates (x',y') of the second memory;

step (b) of setting the negative sine value ($-\sin\theta = -m$) and the cosine value ($\cos\theta = n$) with respect to the rotation angle $\theta$ of the unit point on the y-axis of the first memory to a second initial value (−m,n), determining the coordinates (x',y') of the second memory corresponding to the position (1,1) from the reference point of the coordinates (x,y) of the first memory by adding the second initial values into the initial values (n,m) of coordinates (x', y') of the second memory, respectively, and transmitting the image element data of the first memory related to these determined coordinates to the second memory;

step (c) of accumulating the second initial values (−m,n) whenever the value y of the first memory is incremented by one, and repeating the step (b) N−1 times; and step (d) of incrementing by one the value x of the first memory by one whenever the step (c) ends, accumulating the first initial values (n,m), and repeating the steps (b) and (c) M−1 times.

To achieve the other object of the invention, an image rotation processing apparatus which rotates an image of the magnitude M×N recorded in a first memory according to the given rotation angle $\theta$ and the magnitude M×N, by generating the coordinates (x',y') of the second memory corresponding to the coordinates (x,y) of the first memory, in order to record the image in the second memory, and which comprises:

an address generator for generating the coordinates (x,y) of the first memory corresponding to the given image magnitude M×N by the linear sequential scanning method; and an address converting circuit for accumulating the increments of the values of coordinates (x',y') of the second memory according to the increments of the values of the coordinates (x,y) of the first memory in correspondence to given rotation angle ($\theta$), to generate the coordinates (x',y') of the second memory corresponding to the coordinates (x,y) of the first memory.

BRIEF DESCRIPTION OF THE DRAWINGS

The above objects and other advantages of the present invention will become more apparent by describing the preferred embodiment of the present invention with reference to the attached drawings, in which.

DETAILED DESCRIPTION OF THE INVENTION

The present invention will be described in more detail with reference to the accompanying drawings.

Figure 1:
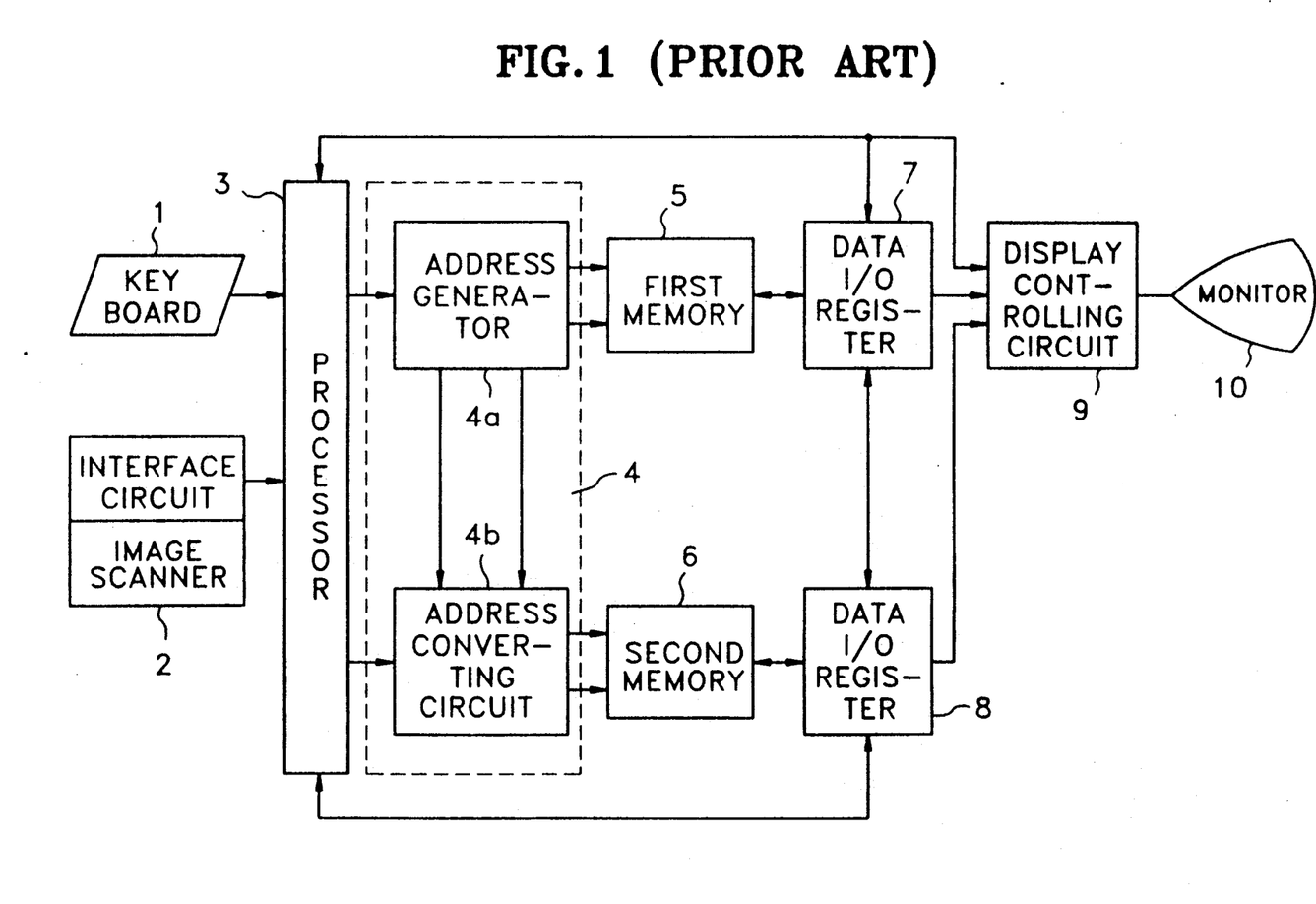
FIG. 1 is a block diagram schematically showing the constitution of the image processing system using a computer.

Referring to FIG. 1, the image processing system comprises a keyboard 1, an image input device 2, a processor 3, an address circuit 4, a first memory 5, a second memory 6, data I/O registers 7 and 8, a display controlling circuit 9, and a monitor 10. The keyboard 1 supplies data such as the image processing mode designation, the rotation angle $\theta$ in an image rotation mode, the image magnitude M×N, etc., to the processor 3. The image input device 2 which receives the original image comprises an image scanner 2a and an interface circuit 2b. The processor 3 controls the system and processes the image data according to the given image processing program. The address circuit 4 comprises an address generator 4a and an address converting circuit 4b. The first memory 5 record an original image received from the image input device 2, and the second memory 6 records an image processed from the original image in the first memory 5. The data I/O registers 7 and 8 latch the data when the data, which is recorded or read in the first and second memories 5 and 6, is input or output. The display controlling circuit 9 receives the image data supplied from the processor 3, the first and second memories 5 and 6 and control the display on the monitor 10.

Figure 2:
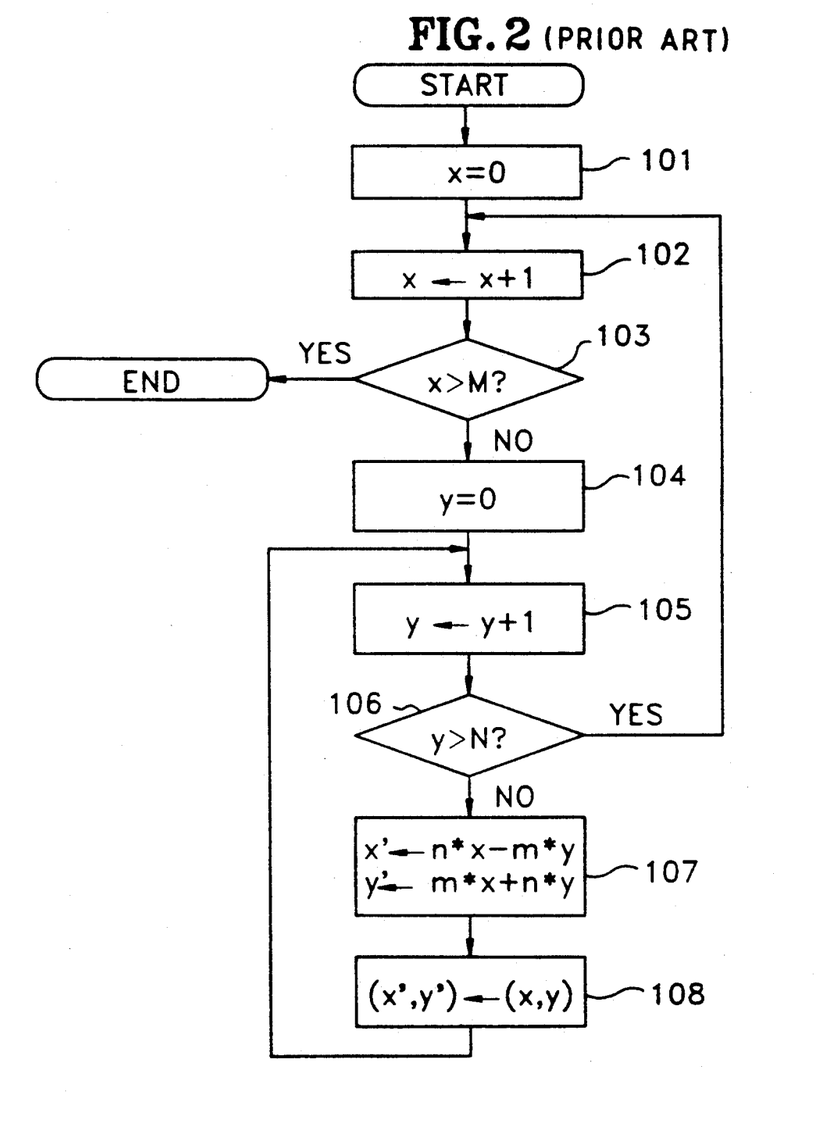
FIG. 2 is a flowchart showing the conventional rotation method.

In such an image processing system, the conventional image rotation method is described with reference to FIG. 2 as follows.

An image is composed of M image element rows and N image element columns, thus forming an entire image of M×N image elements.

In the first portion of the procedure steps 101 to 103, the x value is initialized at zero and incremented by one, and when x becomes greater than the above number of horizontal image element rows M, the above rotational transformation ends. Conversely, until the above x value is not greater, the procedure proceeds to the next step 104.

In the second portion of the following steps 104 to 106, the y value is cleared to zero and incremented by one, and when y becomes greater than the above number of vertical image element columns N, the procedure loops back to the above step 102 where the x value is incremented by one. Conversely, until the above y value is not greater, the procedure proceeds to the next step 107.

Next, in step 107, the image element coordinates x' and y' of the new position are computed based on the above relations (3), and in step 108, the pre-rotational image element coordinates (x,y) are stored in post-rotational image element coordinates (x',y'). Subsequently, the procedure loops back to the above step 105 where the y value is incremented by one.

Therefore, the pre-rotational image element coordinates (x,y) are transformed into post-rotational image element coordinates (x',y') through a specified angle $\theta$. Here, the arithmetic process in the above step 107 requires four multiplication operations as shown in the above relations (3) for every increment of the x and y values.

Accordingly, the above computer graphic system requires 4×M×N multiplication operations to rotate an image composed of M×N image elements, so that if M=2500 and N=2500, 25 million multiplication operations are carried out. If, for example, 10$\mu$s are required for one multiplication process in the above computer graphic system, approximately 250 seconds are required to rotate the image composed of M×N image elements, creating the disadvantage of a greatly decreased processing speed for the rotational transformation of images.

Also, in a computer graphic system in which the geometric transformation mechanism which includes a rotational transformation means is realized through hardware, the system is designed so as to only rotate through certain angles such as 90° or 180°, so there exists the disadvantage of having to alter the hardware itself in order to rotate images through specific angles desired by the user.

Furthermore, in the above computer graphic system for realizing rotational transformation method, special processors suited to such graphic processing are required, and there is the disadvantage that geometric transformations cannot be executed on widely used PCs (personal computers).

Figure 3:
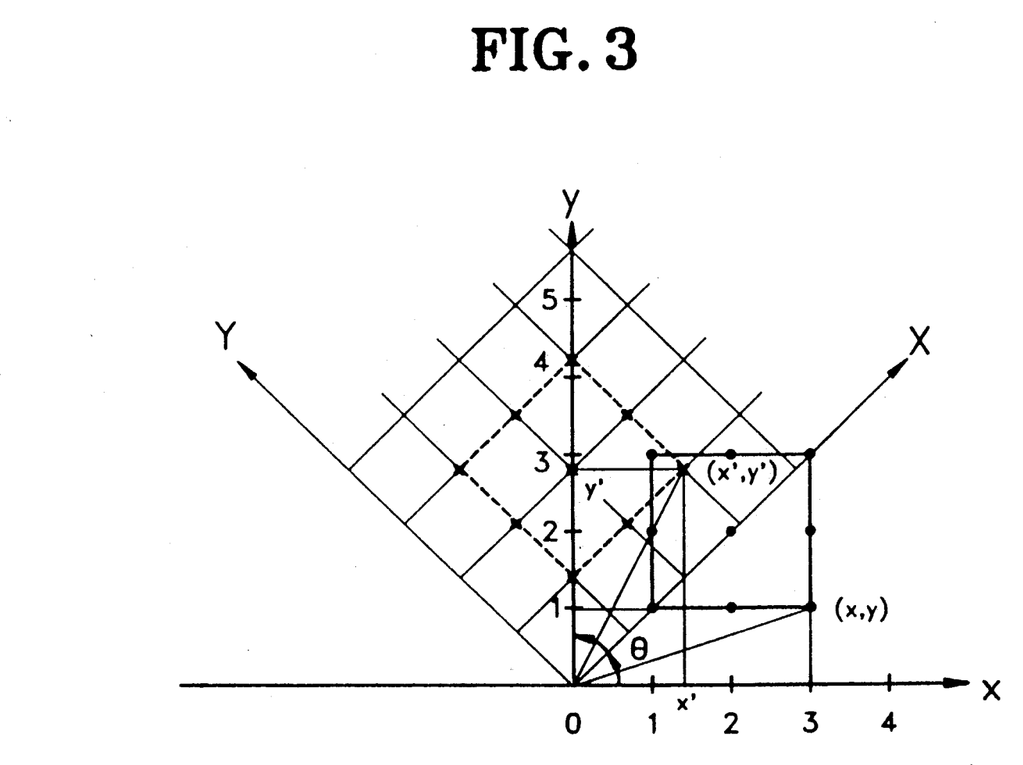
FIG. 3 is a view for visualizing the image rotation method according to the present invention.

The image rotation method of the present invention to improve the conventional image rotation method is described with reference to FIG. 3. Referring to FIG. 3, if the image coordinates (x,y) stored in the first memory 5 are rotated through the relation angle $\theta$, the coordinates are rotated to the coordinates (X,Y). The x-axis coordinate values, (1,0), (2,0), (3,0) and (4,0), correspond to (cos$\theta$, sin$\theta$), (2cos$\theta$, 2sin$\theta$), (3cos$\theta$, 3sin$\theta$) and (4cos$\theta$, 4sin$\theta$) of the X-axis.

Similarly, the y-axis coordinate values, (0,1), (0,2), (0,3), and (0,4) correspond to ($-$sin$\theta$, cos$\theta$), ($-$2sin$\theta$, 2cos$\theta$), ($-$3sin$\theta$, 3cos$\theta$), ($-$4sin$\theta$, 4cos$\theta$) of the Y-axis. That is, if sin$\theta$ is m and cos$\theta$ is n, the coordinate values on the X-axis are denoted as (n,m), (n+n,m+m), (n+2n,m+2m) and (n+3n,m+3m) and the coordinate values on the Y-axis are denoted as ($-$m,n), ($-$m$-$m,n+n), ($-$m$-$2m,n+2n), ($-$m$-$3m,n+3n). Accordingly, if X sequentially varies from 1 to M, all of the X-Y coordinates can be obtained by accumulating the initial value to the initial value (n,m) and if Y sequentially varies from 1 to N, all of points on the X-Y plane can be obtained by accumulating the initial value to the initial value ($-$m,n). With this principle, the M×N image is sequentially scanned, and the increments of X and Y corresponding to the rotation angle $\theta$ are sequentially summed, so that the coordinates (x',y')

of the rotated image can be obtained using only addition operations and without any multiplication.

Accordingly, in an image transformation method and the apparatus thereof according to this invention, new relations which incorporate addition and not multiplication operations, and which form the rotational transformation relations on which the process for computing the new rotationally transformed coordinates (x',y') is based, are obtained as follows.

The aforesaid relations (2) and (3) are derived from the relation (1) where the values of x and y are incremented from 1 through M and from 1 through N, respectively, and if, from relations (3), nx is said to equal ax and mx is said to equal bx, when x is at its initial value "1", then the following is true.

$$a_1 = n$$

$$b_1 = m$$

When x is incremented to its next value "2", then $$\begin{aligned} a_2 &= n(1 + 1) \\ &= n + n \\ &= a_1 + n \\ b_2 &= m(1 + 1) \\ &= m + m \\ &= b_1 + m \end{aligned}$$

Therefore, considering the case where the value of x is incremented by ones, the following relation (4) may be obtained from the above derivations.

$$\left. \begin{aligned} a &= a + n \\ b &= b + m \end{aligned} \right\} \quad (4)$$

Also, considering the case where the value of y is incremented while the value of x remains constant, if the values of coordinates (x',y') of a rotational transformation through a specified angle θ of an image element in an arbitrary position with coordinates (x,y) prior to the rotation have been computed, the rotated coordinates (x',y') of the original coordinates (x,y) with an incremented value of y which is adjacent to the above pre-rotational coordinates (x,y) may be obtained from the following relations (5).

$$\left. \begin{aligned} x' &= x' - m \\ y' &= y + n \end{aligned} \right\} \quad (5)$$

Therefore, rotation variables a and b are computed when x is incremented by one, and the values of x' and y' of the rotated coordinates (x', y') are obtained through addition operations as y is incremented by one.

Figure 4:
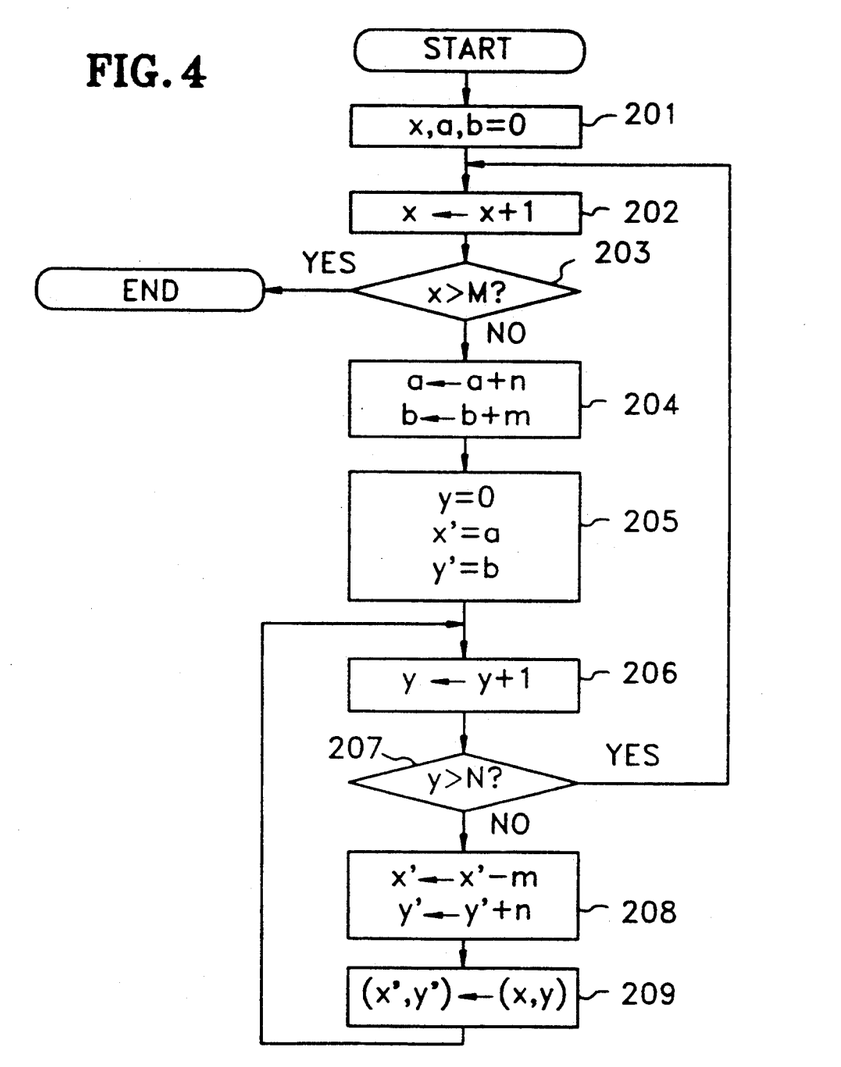
FIG. 4 is a flowchart showing a preferred embodiment of the image rotation method according to the present invention.

A flowchart of a preferred embodiment of an image rotation method according to this invention including a process of addition operations based on the above relations (4) and (5) is described in detail with reference to FIG. 4.

In the first procedure from step 201 to step 203, the value of x and the rotation variables a and b are cleared to zero, and the value of x is incremented by one, and in the comparison of this incremented value of x with the number of horizontal image element rows M, if the value of x is larger, the image transformation ends. Conversely, if the value of x is not greater than M, the procedure proceeds to step 204 which performs the arithmetic operations of the above relations (4). In step 205, the value of y is cleared to zero and the rotation variables a and b computed in the above step 204 are stored in x' and y' of the rotated coordinates (x', y'), respectively. In step 206, the y value is incremented by one, and in step 207, the above incremented y value is compared with the number of vertical image element column N, and if the value of y is larger, the procedure loops back to the above step 202 where the value of x is incremented by one. Conversely, if the value of y is not greater than N, the procedure proceeds to the next step 208, thus ending the second procedure. In step 208, the values x' and y' of the rotated coordinates (x', y') are computed by carrying out the addition operations corresponding to the above relations (5), and in step 209, the values of the coordinates (x, y) are stored in the coordinates (x', y') after being rotationally transformed and the procedure loops back to the above step 206, thus ending the third procedure. By carrying out the above procedures, an image composed of M×N image elements is rotationally transformed through a specified angle θ.

An image transformation method and the apparatus thereof according to this invention employs a process including addition operations instead of conventional multiplication operations, and thus 2×M×N addition operations are required in rotating an image composed of M×N image elements through a specified angle θ, and for example, if M=2500 and N=2500, approximately 12,500,000 addition operations are required.

Therefore, since a computer system's addition operations require less time relative to multiplication operations, and supposing 50 ns are required for one addition operation, rotating the entire image by a specified angle θ would require approximately 1 second.

Thus, an image rotation according to this invention requires only one second, compared to 250 seconds for conventional image rotations, and because the speed of image rotation is increased dramatically, the process can be executed on widely used processors.

The above is a description of an image rotational transformation realized through software and may be applied to an image processing system having the constitution such as the one shown in FIG. 1.

Figure 5:
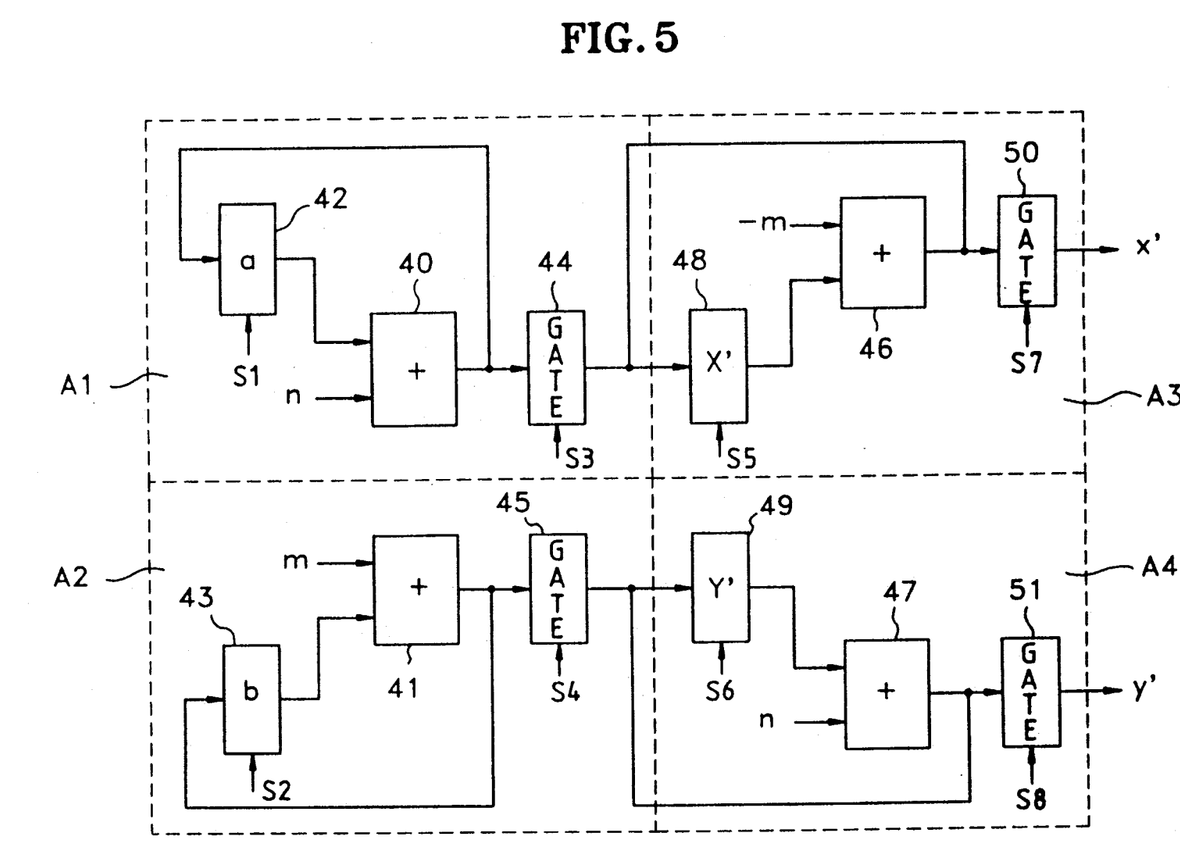
FIG. 5 is a block diagram of a preferred embodiment of the image rotation processing apparatus according to the present invention.

FIG. 5 is a block diagram showing an embodiment of the image rotation processing apparatus according to the present invention.

This image rotation processing apparatus corresponds to the address converting circuit 4b of the address circuit shown in FIG. 1 and comprises first to fourth accumulators A1 to A4. The first accumulator circuit A1 accumulates the cosine value (cos θ=n) corresponding to the rotation angle θ of the unit value (1,0) of the value x of the first memory 5 whenever the value x is incremented by one. The second accumulator circuit A2 accumulates the sine value (sin θ=m) corresponding to the rotation angle θ of the unit value (1,0) of the value x of the first memory 5 whenever the value x is incremented by one. The third accumulator circuit A3 adds the negative sine value (−sin θ=−m) corresponding to the rotation angle θ of the unit value (0,1) of the value y of the first memory 5 into the output value of the first accumulator circuit A1, and accumulates the negative sine value (−m) into the added value whenever the value y is incremented by one, thus determining the accumulated value as the x' coordinate value of the second memory 6. The fourth accumulator circuit A4 receives the output value of the second accumulator circuit A2 and determines the y' coordinate value of the second memory 6 by the identical operation of the third accumulator circuit A3.

Each of first and second accumulator circuits A1 and A2 respectively comprises adders 40 and 41 for summing the cosine value n or the sine value m and the accumulated value, registers 42 and 43 for recording the added results of the adders 40 and 41 and looping back the accumulated result to the adders 40 and 41 in response to control signals S1 and S2, whenever the value x is incremented by one, and transmitting gates 44 and 45 for transmitting the added results of the adders 40 and 41 to the output value in response to control signals S3 and S4, whenever the value x is incremented by one.

Each of third and fourth accumulator circuits A3 and A4 respectively comprises adders 46 and 47 for adding the negative sine value ($-m$) or the sine value (n) into the accumulated value, registers 48 and 49 for being initialized to the output value supplied from the first or second accumulator circuit A1 or A2 whenever the value y is incremented by one, looping back the accumulated value to the adders 46 and 47 in response to control signals S5 and S6, whenever the value y is incremented by one, and recording the added results of the adders 46 and 47, and transmitting gates 50 and 51 for transmitting the added results of the adders 46 and 47 to the x' or y' coordinate value of the second memory in response to control signals S7 and S8, whenever the value y is incremented by one.

Thus, without a floating point multiplier, this image rotation processing apparatus can be made using only adders. Accordingly, the constitution of the circuit is simplified and the cost reduced.

What is claimed is:

1. An image rotation processing apparatus which rotates an image of a magnitude of M×N, recorded in a first memory according to any rotation angle $\theta$ which lies between 0 and 360 degrees by generating rotation coordinates (x', y') of the first memory in order to record the image in a second memory, said apparatus comprising:

an address generator for generating image coordinates (x,y) of the first memory corresponding to a given image magnitude, M×N, by linear sequential scanning; and an address converting circuit including an adder for accumulating increments of values of coordinates (x', y') of the second memory according to the increments of the values of the coordinates (x,y) of the first memory in correspondence with a rotation angle $\theta$, to generate the coordinates (x', y') of the second memory corresponding to the coordinates (x,y) of the first memory.

2. An image rotation processing apparatus as claimed in claim 1, wherein said address converting circuit comprises:

a first accumulator means for accumulating a cosine value (cos=n) corresponding to the rotation angle $\theta$ of a unit value of the value x of the first memory whenever the value x is incremented by one;

a second accumulator means for accumulating a sine value (sin=m) corresponding to the rotation angle $\theta$ of the unit value of the value x of the first memory whenever the value x is incremented by one;

a third accumulator means connected to said first accumulator means for adding a negative sine value ($-\sin=-m$) corresponding to the rotation angle $\theta$ of a unit value of the value y of the first memory into the output value of said first accumulator means and accumulating said negative sine value ($-m$) into the added value whenever the value y is incremented by one, to determine the value of the coordinate x' of the second memory; and a fourth accumulator means connected to said second accumulator means for adding the cosine value (cos=n) corresponding to the rotation angle $\theta$ of the unit value of the value y of the first memory into the output value of said second accumulator means and accumulating the cosine value (n) into the added value whenever the value y is incremented by one, to determine the value of the coordinate y' of the second memory.

3. An image rotation processing apparatus as claimed in claim 2, wherein each of said first and second accumulator means comprises:

a first adder for adding the cosine value (n) or the sine value (m) to an accumulated result value;

a first register connected to said first adder which records the accumulated result of said adder;

feedback means interconnecting said first register and said first adder for feeding the accumulated result value from said first register to said first adder whenever the value of x is incremented by one; and a transmitting gate connected to said first adder which transmits the added result of said first adder whenever the value of x is incremented by one.

4. An image rotation processing apparatus as claimed in claim 3, wherein each of said third and fourth accumulator means comprises:

a second adder for adding said negative sine value ($-m$) or cosine value (n) to an accumulated result value;

a second register connected to said second adder which is initialized to the transmitted added result supplied from said first or second accumulator means whenever the value x is incremented by one and which records the added result of said second adder whenever the value y is incremented by one;

feedback means interconnecting said second register and said second adder for feeding the accumulated result value back into said second adder; and a transmitting gate for transmitting the added result of said second adder to the value of the coordinate x' or y' of the second memory whenever the value y is incremented by one.

5. An image rotation processing apparatus which rotates an M×N image, said apparatus comprising:

a first accumulator circuit for accumulating the cosine value corresponding to a rotation angle $\theta$ of the unit value of the coordinate value x;

a second accumulator circuit for accumulating the sine value corresponding to the rotation angle $\theta$ of the unit value of the coordinate value x;

a third accumulator circuit for adding the negative sine value corresponding to the rotation angle $\theta$ of the unit value of the coordinate value y to an output of said first accumulator circuit, and summing the negative sine value with the added value to determine the value of the rotated coordinate x'; and a fourth accumulator circuit for adding the cosine value corresponding to the rotation angle $\theta$ of the unit value of the coordinate value y to an output value of said second accumulator circuit and summing the cosine value with the added value to determine the value of the rotated coordinate y'.

6. An image rotation processing circuit which rotates on M×N image through a rotation angle $\theta$, said circuit comprising:

a first adder having first and second inputs and an output;

a first register connected to the output of said adder which stores the output from said first adder;

means for supplying a cosine value (n) of the rotation angle $\theta$ as the first input to said first adder;

feedback means interconnecting said first register and said adder for supplying the contents of said first register as the second input to said first adder;

a first transmitting gate connected to said first adder which transmits the output of said first adder;

a second adder having first and second inputs and an output;

means for supplying a negative sine value (−m) of the rotation angle $\theta$ to the adder as the first input;

a second register connected to said first transmission gate and the output of said second adder;

feedback means interconnecting said second adder and said second register for supplying the contents of said second register as the second input to said second adder;

a second transmitting gate connected to said second adder which transmits the output of said second adder responsive to a control signal to produce a rotational coordinate x';

a third adder having first and second inputs and an output;

a third register connected to the output of said adder which stores the output from said third adder;

means for supplying a sine value (m) of the rotation angle $\theta$ as the first input to said third adder;

feedback means interconnecting said third register and said third adder for supplying the contents of said third register as the second input to said third adder;

a third transmitting gate connected to said third adder which transmits the output of said third adder;

a fourth adder having first and second inputs and an output;

means for supplying the negative sine value (−m) to the adder as the first input;

a fourth register connected to said first transmission gate and the output of said fourth adder;

feedback means interconnecting said fourth adder and said fourth register for supplying the contents of said fourth register as the second input to said fourth adder;

a fourth transmitting gate connected to said fourth adder which transmits the output of said fourth adder responsive to a second control signal to produce a rotational coordinate y'.

* * * * *